United States Patent
Kong

(10) Patent No.: US 11,316,392 B2
(45) Date of Patent: Apr. 26, 2022

(54) MOTOR

(71) Applicant: LG INNOTEK CO., LTD., Seoul (KR)

(72) Inventor: Bong Bae Kong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 123 days.

(21) Appl. No.: 16/636,284

(22) PCT Filed: Jul. 31, 2018

(86) PCT No.: PCT/KR2018/008657
§ 371 (c)(1),
(2) Date: Feb. 3, 2020

(87) PCT Pub. No.: WO2019/027217
PCT Pub. Date: Feb. 7, 2019

(65) Prior Publication Data
US 2021/0167648 A1 Jun. 3, 2021

(30) Foreign Application Priority Data

Aug. 3, 2017 (KR) .................. 10-2017-0098591

(51) Int. Cl.
*H02K 1/27* (2006.01)
*H02K 1/28* (2006.01)
*H02K 1/274* (2022.01)

(52) U.S. Cl.
CPC ............. *H02K 1/28* (2013.01); *H02K 1/274* (2013.01)

(58) Field of Classification Search
CPC .......... H02K 1/28; H02K 1/274; H02K 1/278; H02K 1/04; H02K 15/12; B62D 5/0403
See application file for complete search history.

(56) References Cited

U.S. PATENT DOCUMENTS

| 6,628,034 | B2* | 9/2003 | Jang ................. H02K 21/16 310/210 |
| 2007/0210663 | A1* | 9/2007 | Kalavsky ............ H02K 1/30 310/156.19 |
| 2009/0139079 | A1* | 6/2009 | Shibui .................. H02K 7/04 29/598 |

FOREIGN PATENT DOCUMENTS

| EP | 2 597 753 A2 | 5/2013 |
| KR | 10-2008-0100572 A | 11/2008 |
| KR | 10-2011-0072678 A | 6/2011 |

(Continued)

OTHER PUBLICATIONS

Supplementary European Search Report dated Mar. 31, 2021 in European Application No. 18842178.8.

(Continued)

*Primary Examiner* — Thomas Truong
(74) *Attorney, Agent, or Firm* — Saliwanchik, Lloyd & Eisenschenk

(57) ABSTRACT

The present invention may provide a motor including a stator, a rotor disposed inside the stator, and a shaft coupled to the rotor, wherein the rotor includes a rotor core disposed outside the shaft, a magnet disposed outside the rotor core, and a molding part which molds the rotor core and the magnet, and the molding part includes an upper part disposed on an upper surface of the magnet, a lower part disposed on a lower surface of the magnet, a lateral part disposed on a side surface of the magnet, and a protrusion part which protrudes from the lateral part in an axial direction of the shaft.

11 Claims, 8 Drawing Sheets

(56) References Cited

FOREIGN PATENT DOCUMENTS

| KR | 10-2013-0120383 A | 11/2013 |
| KR | 10-2015-0009891 A | 1/2015 |
| KR | 10-2017-0021389 A | 2/2017 |
| WO | WO-2013/104998 A2 | 7/2013 |

OTHER PUBLICATIONS

Office Action dated May 14, 2021 in Chinese Application No. 201880050407.1.
International Search Report in International Application No. PCT/KR2018/008657, filed Jul. 31, 2018.
Collapsible Core Manufacturing Support for Bearing Plastic Cage Mass Production, Completion Report [online], Korea Institute of Industrial Technology et al., May 2006, <URL: http://www.itfind.or.kr/Report02/201112/KIAT-1256.pdf>.
"Solvay Demonstrates Use of Overflow Tabs to Improve Weld Line Strength of Reinforced Plastic Parts," *Solvay*, Sep. 12, 2013, pp. 1-4, Solvay Specialty Polymers USA, LLC.
Office Action dated Jan. 7, 2022 in Korean Application No. 10-2017-0098591.

* cited by examiner

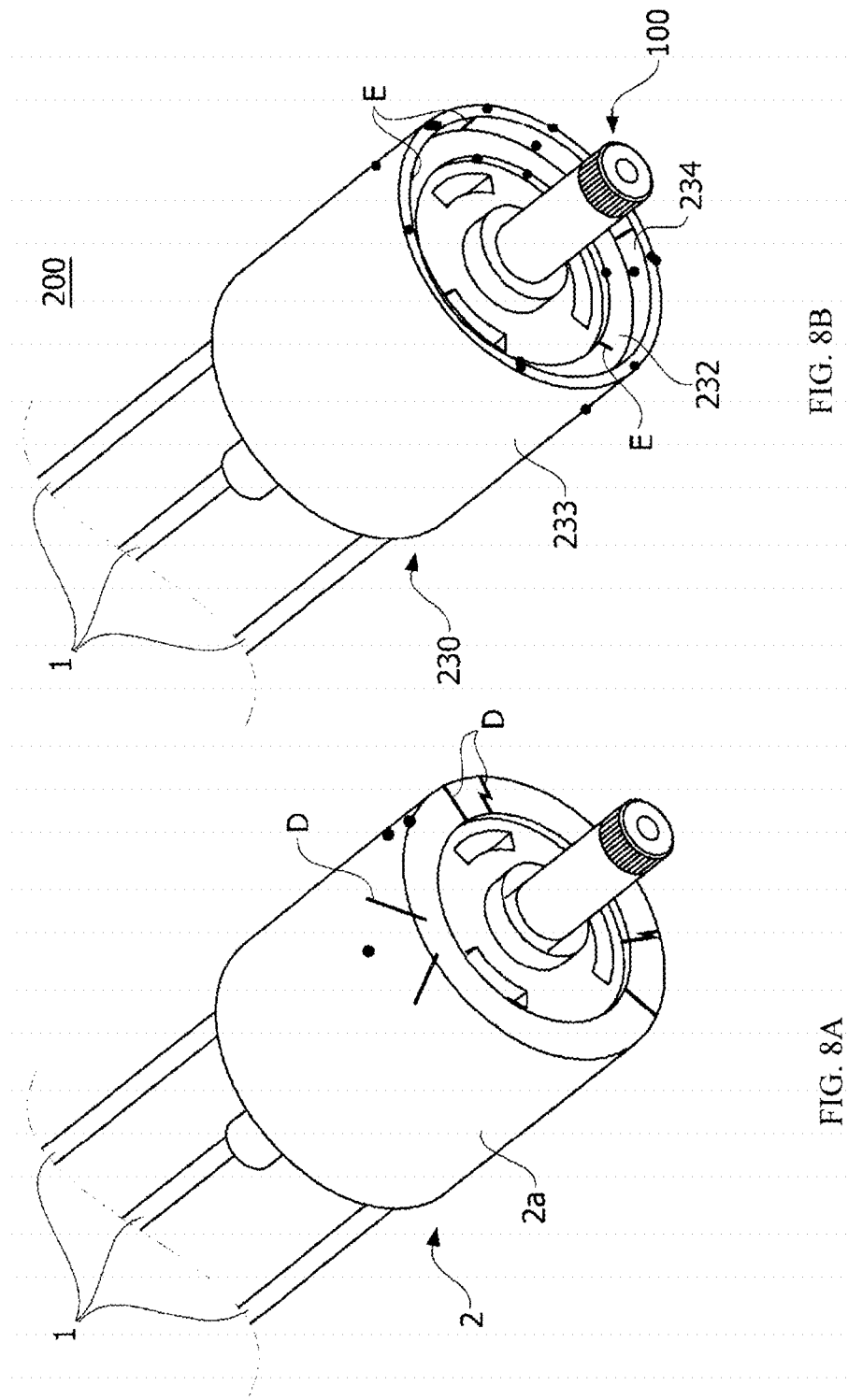

MOTOR

CROSS-REFERENCE TO RELATED APPLICATIONS

This application is the U.S. national stage application of International Patent Application No. PCT/KR2018/008657, filed Jul. 31, 2018, which claims the benefit under 35 U.S.C. § 119 of Korean Application No. 10-2017-0098591, filed Aug. 3, 2017 the disclosures of each of which are incorporated herein by reference in their entirety.

TECHNICAL FIELD

The present invention relates to a motor.

BACKGROUND ART

An electric power steering system (EPS) is a system which secures turning stability of a vehicle and rapid restoring force so that a driver can stably drive. The EPS drives a motor to control operation of a steering shaft of the vehicle through an electronic control unit (ECU) according to travel conditions detected by a vehicle speed sensor, a torque angle sensor, and the like.

A motor includes a rotor and a stator. The rotor may include a rotor core and magnets. The magnets may be attached to an outer circumferential surface of the rotor core. In addition, a molding portion surrounds the magnets and the rotor core. In this case, since a thickness of the molding portion is thin in a region in which the magnets are disposed, injection molding may not be smoothly performed and air discharge may not be smooth in the corresponding region. Accordingly, the molding portion may be incompletely molded, air may be trapped, or a weld line may be generated.

Technical Problem

The present invention is directed to providing a motor capable of being inhibited from incomplete molding of a molding portion, air trap, and generation of a weld line.

Objectives that should be solved according to embodiments are not limited to the above described objectives, and other objectives which are not described above will be clearly understood by those skilled in the art from the following specification.

Technical Solution

One aspect of the present invention provides a motor including a stator, a rotor disposed inside the stator, and a shaft coupled to the rotor, wherein the rotor includes a rotor core disposed outside the shaft, a magnet disposed outside the rotor core, and a molding portion which molds the rotor core and the magnet, and the molding portion includes an upper part disposed on an upper surface of the magnet, a lower part disposed on a lower surface of the magnet, a lateral part disposed on a side surface of the magnet, and a protrusion part which protrudes from the lateral part in an axial direction of the shaft.

The protrusion part may include a hollow portion therein.

The lower part, the upper part, the protrusion part, and the lateral part of the molding portion may be formed as a single part.

The protrusion part of the molding portion may protrude further than the upper part or the lower part of the molding portion in a direction of the shaft.

A thickness of the protrusion part may be an average value of a thickness of the upper part, a thickness of the lateral part, and a thickness of the lower part.

At least a part of the upper part of the molding portion may be disposed inward from an outer circumferential surface of the rotor core.

The rotor core may include a plurality of holes disposed in a direction of the shaft, and an inner boundary of the upper part of the molding portion or an inner boundary of the lower part of the molding portion may be disposed between an outer circumferential surface of the rotor core and the holes.

The protrusion part may be disposed in a circumferential direction of the rotor core.

The protrusion part may have a ring shape.

The protrusion part may be formed at a side opposite an injection molding gate of the molding portion.

Advantageous Effects

According to embodiments, the present invention provides an advantageous effect of inhibiting incomplete molding of a molding portion, incomplete air discharge, and generation of a weld line by guiding a disadvantageous weld line or air trap using a protrusion part of the molding portion.

DESCRIPTION OF DRAWINGS

FIGS. 8A and 8B are views illustrating a comparison between weld lines in the rotor not including a protrusion part and weld lines in the rotor including the protrusion part according to the embodiment.

MODES OF THE INVENTION

Hereinafter, exemplary embodiments of the present invention will be described in detail with reference to the accompanying drawings.

However, the technical spirit of the present invention is not limited to some embodiments which will be described herein and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element by still another element disposed therebetween.

In a case in which any one element is described as being formed or disposed "on or under" another element, such a description includes both cases in which the two elements are formed or disposed to be in direct contact with each other and one or more other elements are interposed between the two elements. In addition, when one element is described as being disposed "on or under" another element, such a description may include a case in which the one element is disposed at an upper side or a lower side with respect to another element.

Figure 1:
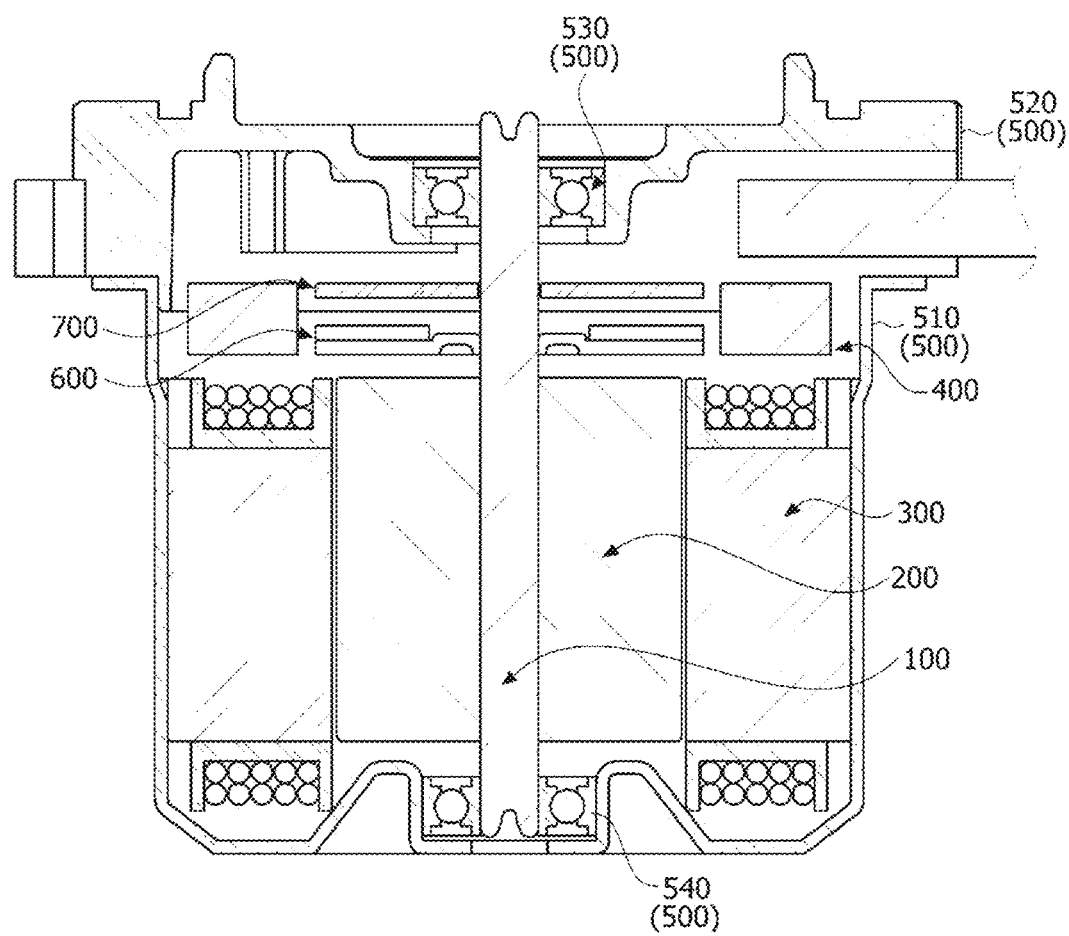
FIG. 1 is a cross-sectional side view illustrating a motor according to an embodiment.

FIG. 1 is a cross-sectional side view illustrating a motor according to an embodiment.

Referring to FIG. 1, a motor 10 according to the embodiment may include a shaft 100, a rotor 200, a stator 300, a bulbar 400, a housing 500, a sensing magnet 600, and a printed circuit board 700.

The shaft 100 may be coupled to the rotor 200. When a current is supplied and an electromagnetic interaction occurs between the rotor 200 and the stator 300, the rotor 200 rotates and the shaft 100 rotates in conjunction with the rotor 200. The shaft 100 may be connected to a steering shaft of a vehicle to transmit power to the steering shaft.

The rotor 200 electrically interacts with the stator 300 and rotates.

The rotor 200 may include a rotor core and magnets. The rotor core may be formed of a plurality of plates which each have a thin circular steel plate shape and which are stacked, or may have a cylindrical shape. A hole coupled to the rotating shaft 100 may be formed at a center of the rotor core. A protrusion part which guides the magnets may protrude from an outer circumferential surface of the rotor core. The magnets may be attached to the outer circumferential surface of the rotor core. The plurality of magnets may be disposed along a circumference of the rotor core at predetermined distances.

A coil may be wound around the stator 300 to induce an electrical interaction between the stator 300 and the rotor 200. A specific structure of the stator 300 around which the coil is wound will be described below. The stator 300 may include a stator core having a plurality of teeth. A ring-shaped yoke portion and the teeth around which the coil is wound from a yoke toward a center of the teeth may be provided in the stator core. The teeth may be provided along an outer circumferential surface of the yoke portion at predetermined distances. Meanwhile, the stator core may be formed of a plurality of plates which each have a thin steel plate shape and which are stacked on each other. In addition, a plurality of separate cores may be coupled or connected to each other to form the stator core.

The busbar 400 may be disposed on the stator 300. The busbar 400 may include a terminal in a ring-shaped molding member.

The housing 400 may accommodate the rotor 200 and the stator 300 therein. The housing 500 may include a body 510 and a bracket 520. The body 510 has a cylindrical shape. The body 510 may be formed of a metal material such as aluminum. In addition, an upper part of the body 510 is open. The bracket 520 covers the open upper part of the body 510. The stator 300 may be positioned inside the body 510, and the rotor 200 may be disposed inside the stator 300. A first bearing 530 may be disposed in a central portion of the bracket 520. In addition, a second bearing 540 may be disposed on a bottom surface of the body 510. The first bearing 530 and the second bearing 540 rotatably support the shaft 100.

The sensing magnet 600 is coupled to the rotating shaft 100 to operate in conjunction with the rotor 200 so as to detect a position of the rotor 200.

A sensor configured to detect a magnetic force of the sensing magnet 600 may be disposed on the printed circuit board 700. In this case, the sensor may be a Hall integrated circuit (IC). The sensor detects changes of an N-pole and a P-pole of the sensing magnet 600 to generate a sensing signal.

Figure 2:
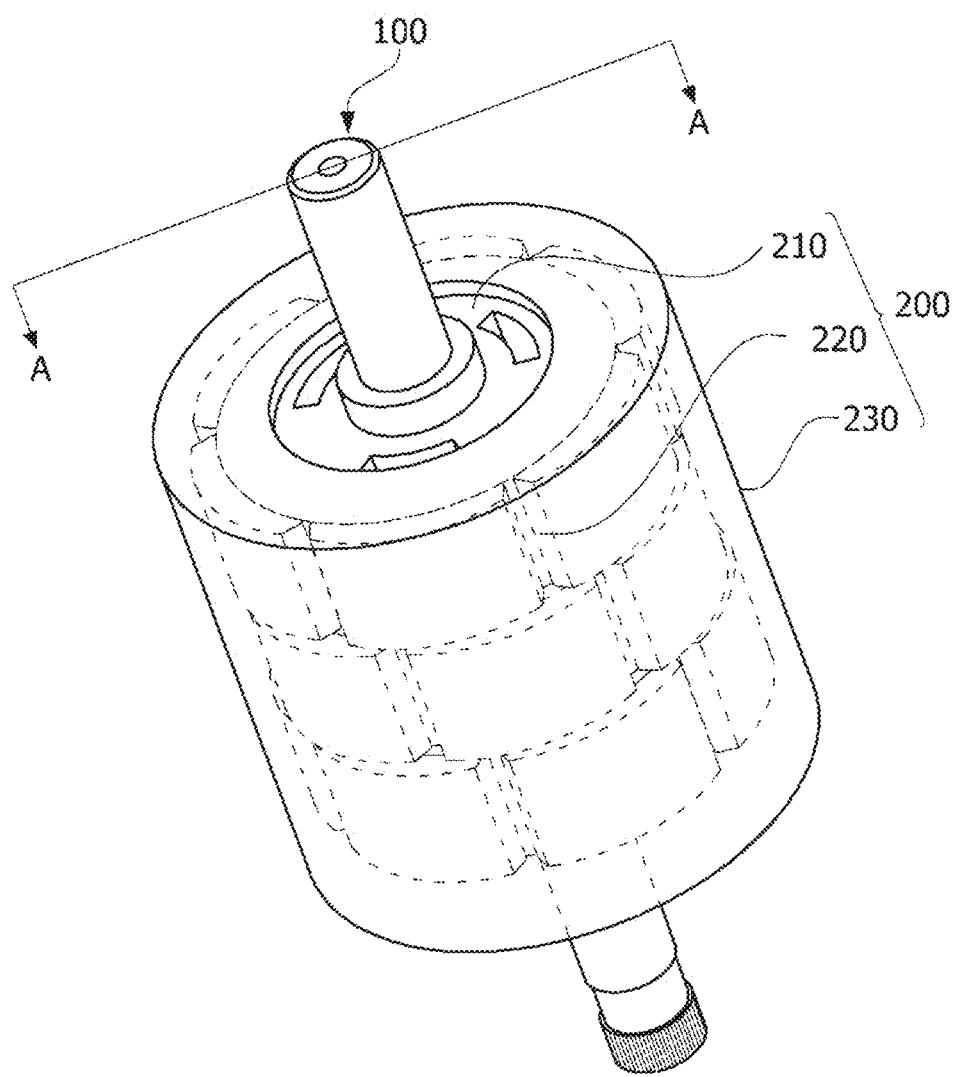
FIG. 2 is a view illustrating a rotor illustrated in FIG. 1.
Figure 3:
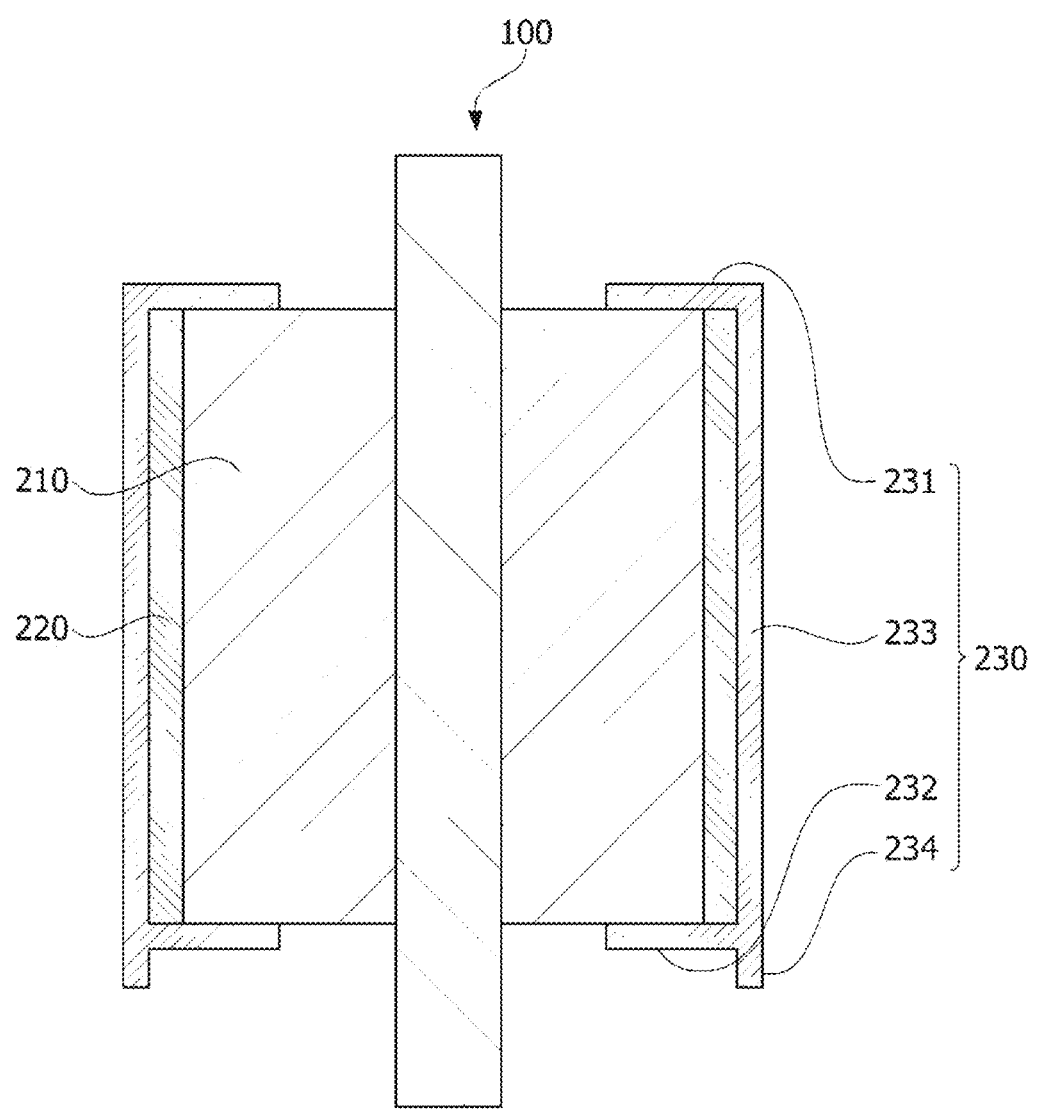
FIG. 3 is a cross-sectional view illustrating the rotor taken along line A-A of FIG. 2.

FIG. 2 is a view illustrating a rotor illustrated in FIG. 1, and FIG. 3 is a cross-sectional view illustrating the rotor taken along line A-A of FIG. 2.

Referring to FIGS. 2 and 3, the rotor 200 may include a rotor core 210, magnets 220, and a molding portion 230.

The rotor core 210 may have the form of a single core or a form in which a plurality of pucks are stacked. In addition, the magnets 220 are attached on an outer circumferential surface of the rotor core 210. In the case in which the rotor core 210 has the form in which the plurality of pucks are stacked, the magnets 220 may be attached to outer circumferential surfaces of the pucks. In this case, the magnets 220 may be disposed on the rotor core 210 with a predetermined skew angle.

The molding portion 230 is disposed to surround the rotor core 210 and the magnets 220. The molding portion 230 inhibits the magnets 220 from being separated from the rotor core 210 and being damaged due to external conditions. The molding portion 230 may be divided into an upper part 231, a lower part 232, a lateral part 233, and a protrusion part 234. The upper part 231, the lower part 232, the lateral part 233, and the protrusion part 234 may just be separately described according to shapes and features thereof but are formed through an injection molding and connected to each other to form one unit.

The upper part 231 is disposed on upper surfaces of the magnets 220. The lateral part 233 is disposed on side surfaces of the magnets 220, in addition, the lower part 232 is disposed on lower surfaces of the magnets 220. In a case in which the rotor core 210 has the form in which the plurality of pucks are stacked and the magnets 220 are attached to the pucks, the upper surfaces of the magnets 220 may be disposed on the pucks positioned at the uppermost end of the molding portion 230. In addition, the lower surfaces of the magnets 220 may be disposed on the pucks positioned at the lowermost end of the molding portion 230. The upper part 231 is a portion connected to an injection molding gate when an injection molding is performed, and the lower part 232 is a portion that is further away from the injection molding gate than the upper part 231 and the lateral part 233.

The protrusion part 234 is a portion protruding from the lateral part 233 in an axial direction of the shaft 100. Specifically, the protrusion part 234 may protrude from a portion at which the lateral part 233 is connected to the lower part 232 in the axial direction of the shaft 100. In addition, the protrusion part 234 may be disposed in a circumferential direction of the rotor core 210. For example, an overall shape of the protrusion part 234 may be a ring shape.

Figure 4:
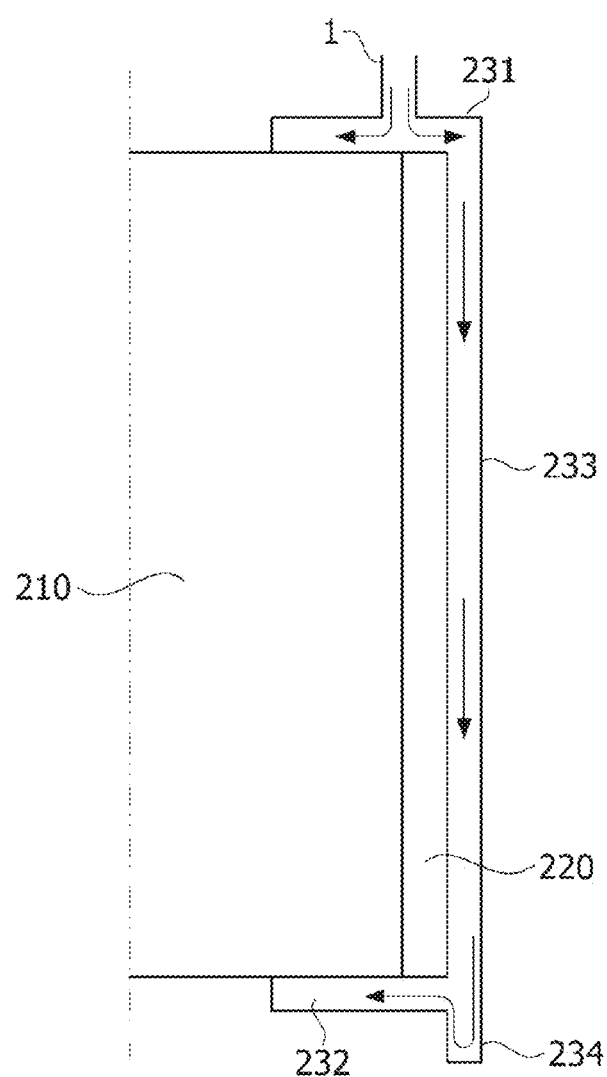
FIG. 4 is a view illustrating a flow of injection molding.
Figure 5:
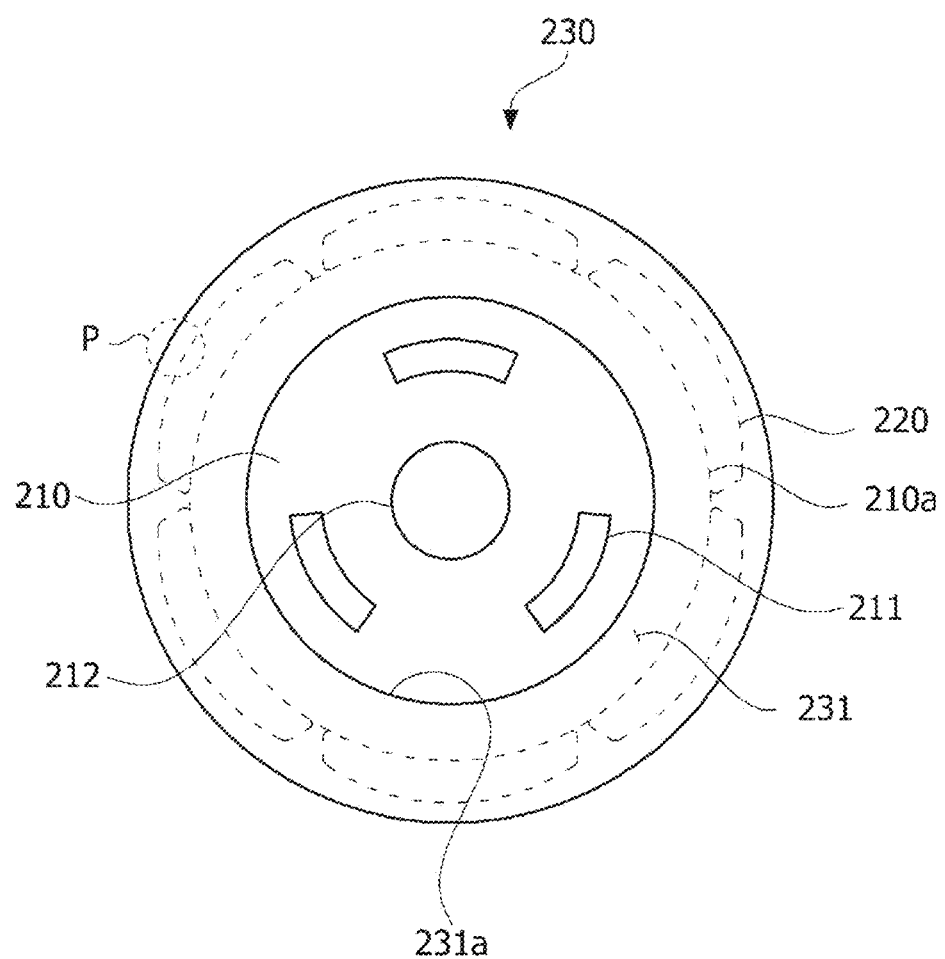
FIG. 5 is a plan view illustrating the rotor.

FIG. 4 is a view illustrating a flow of injection molding, and FIG. 5 is a plan view illustrating the rotor.

Referring to FIGS. 4 and 5, during the flow of injection molding, molding flows from the upper part 231 connected to a gate 1 to the lateral part 233 and flows from the lateral part 233 to the lower part 232 via the protrusion part 234. In this case, an injection molding flow region of the lateral part 233 may be narrow. Referring to FIG. 5, in a region P of FIG. 5 in which the injection molding flow region is narrow due to the magnets 220, air discharge is not smooth and cracks may occur due to incomplete molding, air traps, and weld lines.

The protrusion part 234 leads overflow to guide air traps or weld lines to move to the protrusion part 234 during the injection molding flow. The protrusion part 234 is a region unrelated to a function of the molding portion 230. A region in which the air traps are generated or a region in which the weld lines are generated in the molding portion 230 is weak to thermal expansion and weak to moisture or oil permeation. Accordingly, by moving the air traps or weld lines to the protrusion part 234 unrelated to the function of the molding portion 230, the function of the molding portion 230 is secured.

Meanwhile, referring to FIG. 5, the rotor core 210 may include a plurality of holes 211 and a central hole 212. The shaft 100 passes through the central hole 212 (see FIG. 1). The plurality of holes 211 are disposed along a circumference of the central hole 212. The holes 211 may pass from an upper surface of the rotor core 210 to a lower surface thereof to be longitudinally disposed in the axial direction of the shaft 100 (see FIG. 1).

The upper part 231 covers a part of the upper surface of the rotor core 210. Specifically, based on a radial direction of the rotor core 210, an inner boundary 231a of the upper part 231 may be disposed between an outer circumferential surface 210a of the rotor core 210 and the holes 211. That is, the upper part 231 may be disposed to not cover the holes 211. Although the lower part 232 is not illustrated in the drawing, an inner boundary of the lower part 232, like the upper part 231, may also be disposed between the outer circumferential surface 210a of the rotor core 210 and the holes 211 so as to not cover the holes 211.

Figure 6:
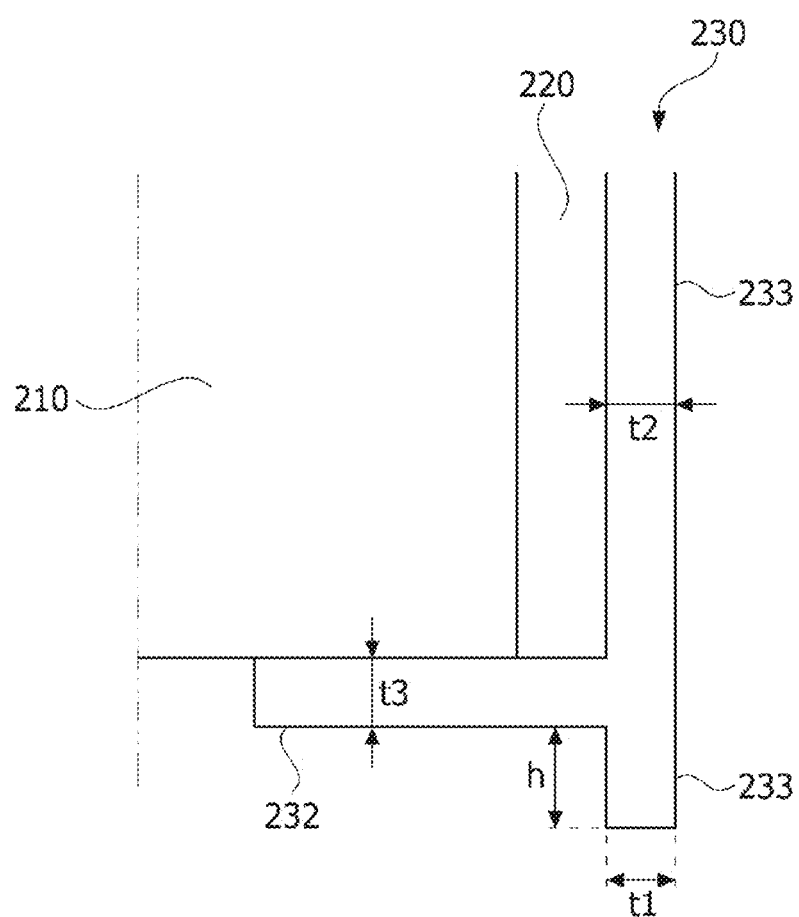
FIG. 6 is an enlarged cross-sectional view illustrating a protrusion part.

FIG. 6 is an enlarged cross-sectional view illustrating a protrusion part.

Referring to FIG. 6, a height h of the protrusion part 234 may be suitably designed to correspond to a position of the gate 1 (see FIG. 4) or an inner structure of the motor. For example, a maximum value of the height h of the protrusion part 234 may be determined such that the protrusion part 234 is not in contact with the second bearing 540 and a bottom surface of the housing 500.

Meanwhile, a thickness t1 of the protrusion part 234 may be suitably designed by considering the position of the gate 1 (see FIG. 4) and the height h of the protrusion part 234. Particularly, when it is assumed that a thickness of the upper part 231 (see FIG. 3) is equal to a thickness t3 of the lower part 232, the thickness t1 of the protrusion part 234 may have an average value of a thickness t2 of the lateral part 233 and the thickness t3 of the lower part 232.

Figure 7B:
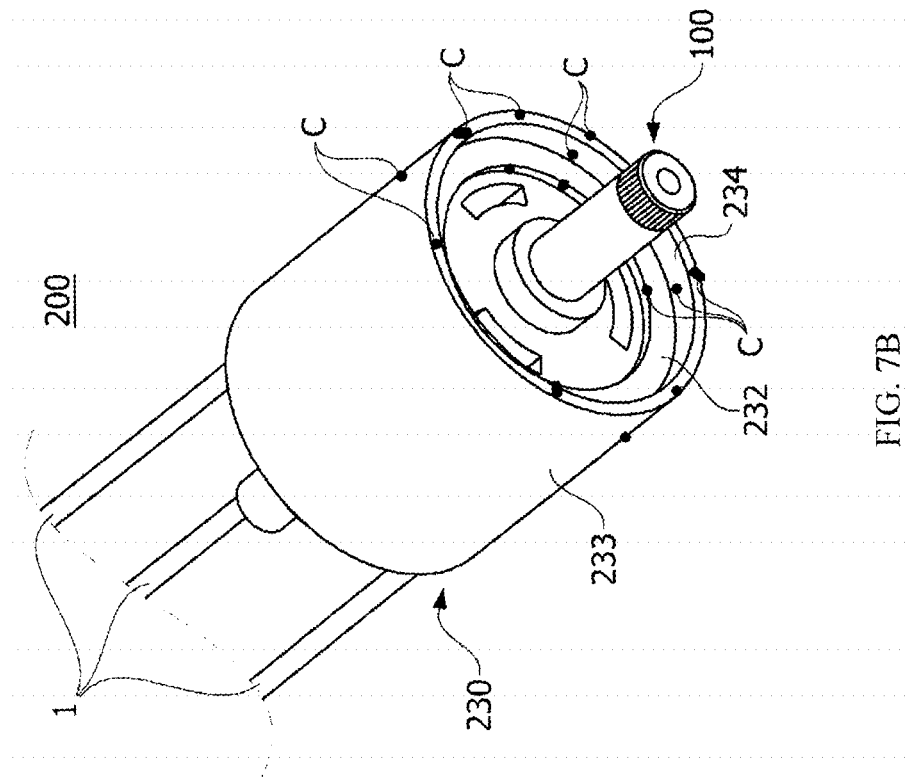
FIGS. 7A and 7B are views illustrating a comparison between air traps generated in a rotor not including a protrusion part and air traps generated in the rotor including the protrusion part according to the embodiment.
Figure 7A:
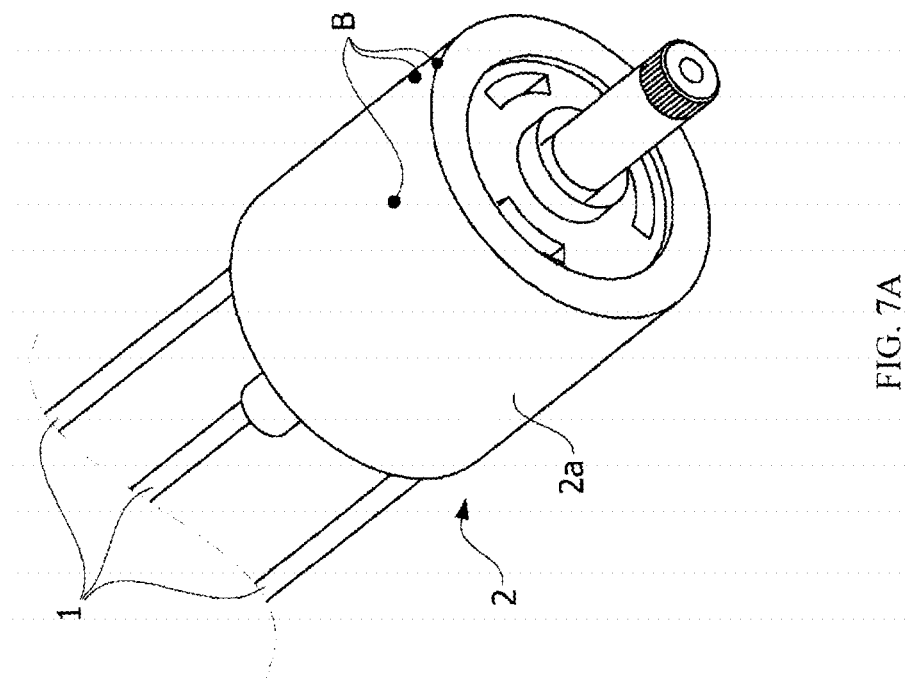

FIGS. 7A and 7B are views illustrating a comparison between air traps generated in a rotor not including a protrusion part and air traps generated in the rotor including the protrusion part according to the embodiment.

FIG. 7A is a view illustrating air traps B in a general rotor 2 not including a protrusion part. It may be seen that the plurality of air traps B are generated in a side surface and a lower surface of a molding portion 2a. The side surface and the lower surface of the molding portion 2a are regions which serve to inhibit magnets from being separated from a rotor core and to directly cover and protect magnets 220 (see FIG. 2). Accordingly, in a case in which a problem happens in the regions, the damage of the rotor 2 is enlarged, and a defect fatal to a motor is generated.

FIG. 7B is a view illustrating air traps C generated in the rotor 200 including the protrusion part of the motor according to the embodiment. It may be seen that a plurality of air traps C which may be generated in the lateral part 233 and the lower part 232 of the molding portion 230 move to the protrusion part 234. Since the protrusion part 234 is a region unrelated to the function of the molding portion 230, even when the plurality of air traps C are present, the plurality of air traps C do not affect execution of the function of the molding portion 230.

FIGS. 8A and 8B are views illustrating a comparison between weld lines in the rotor not including a protrusion part and weld lines in the rotor including the protrusion part according to the embodiment.

FIG. 8A is a view illustrating weld lines D generated in the general rotor 2 not including the protrusion part. It may be seen that a plurality of weld lines D are generated in the side surface and the lower surface of the molding portion 2a. Particularly, there are portions of which thicknesses are very thin according to positions of magnets in the side surface of the molding portion 2a. Accordingly, in a case in which the weld lines D are present in the side surface of the molding portion 2a, a probability of crack generation in the molding portion 2a increases.

FIG. 8B is a view illustrating weld lines E in the rotor 200 including the protrusion part of the motor according to the embodiment. It may be seen that many of the plurality of weld lines E which may be generated in the lateral part 233 and the lower part 232 of the molding portion 230 move to the protrusion part 234. Since the protrusion part 234 is a region unrelated to the function of the molding portion 230, even when cracks occur, the cracks do not affect execution of the function of the molding portion 230.

Air traps or weld lines are factors which weaken the strength of the molding portion. Generally, in order to inhibit generation of air traps and weld lines, a method of performing a preheating process or injection-molding the molding portion to have a thickness which is greater than a design thickness of the molding portion and cutting the molding portion is used. However, this method has problems in that the cutting process is added and a material is wasted.

In the motor according to the embodiment, air traps and weld lines are moved to the protrusion part 234 due to the protrusion part 234 which leads overflow during the injection molding flow, and thus the strength of the molding portion 230 is secured. Accordingly, when the motor according to the embodiment is manufactured, the preheating and cutting processes are not needed, and a problem in that an injection molding material is wasted can also be removed.

As described above, the motor according to the exemplary embodiment of the present invention has been specifically described with reference to the accompanying drawings. The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not for limiting the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a stator;
a rotor disposed inside the stator; and
a shaft coupled to the rotor,
wherein the rotor includes a rotor core disposed outside the shaft, a magnet disposed outside the rotor core, and a molding portion which molds the rotor core and the magnet,
wherein the molding portion includes an upper part disposed on both an upper surface of the magnet and an upper surface of the rotor core, a lower part disposed on both a lower surface of the magnet and a lower surface of the rotor core, a lateral part disposed on a side surface of the magnet, and a protrusion part that protrudes from the lateral part in an axial direction of the shaft,
wherein the protrusion part is disposed at the portion where the lower part and the lateral part are connected, and
wherein the protrusion part is extended in a direction perpendicular to the lower part.

2. The motor of claim 1, wherein the lower part, the upper part, the protrusion part, and the lateral part of the molding portion are formed as a single part.

3. The motor of claim 1, wherein the protrusion part of the molding portion protrudes further than the upper part or the lower part of the molding portion in a direction of the shaft.

4. The motor of claim 1, wherein at least a part of the upper part of the molding portion is disposed inward from an outer circumferential surface of the rotor core.

5. The motor of claim 1, wherein the lower part and the protrusion part are branched from the lateral part.

6. A motor comprising:
a stator;
a rotor disposed inside the stator; and
a shaft coupled to the rotor,
wherein the rotor includes a rotor core disposed outside the shaft, a magnet disposed outside the rotor core, and a molding portion which molds the rotor core and the magnet,
wherein the molding portion includes an upper part disposed on an upper surface of the magnet, a lower part disposed on a lower surface of the magnet, a lateral part disposed on a side surface of the magnet, and a protrusion part that protrudes from the lateral part in an axial direction of the shaft,
wherein the protrusion part is disposed at the portion where the lower part and the lateral part are connected, and
wherein the protrusion part is disposed in a circumferential direction of the rotor core.

7. The motor of claim 6, wherein the protrusion part has a ring shape.

8. A motor comprising:
a stator;
a rotor disposed inside the stator; and
a shaft coupled to the rotor,
wherein the rotor includes a rotor core disposed outside the shaft, a magnet disposed outside the rotor core, and a molding portion which molds the rotor core and the magnet,
wherein the molding portion includes an upper part disposed on an upper surface of the magnet, a lower part disposed on a lower surface of the magnet, a lateral part disposed on a side surface of the magnet, and a protrusion part that protrudes from the lateral part in an axial direction of the shaft,
wherein the protrusion part is disposed at the portion where the lower part and the lateral part are connected, and
wherein the protrusion part includes a hollow portion therein.

9. A motor comprising:
a stator;
a rotor disposed inside the stator; and
a shaft coupled to the rotor,
wherein the rotor includes a rotor core disposed outside the shaft, a magnet disposed outside the rotor core, and a molding portion which molds the rotor core and the magnet,
wherein the molding portion includes an upper part disposed on an upper surface of the magnet, a lower part disposed on a lower surface of the magnet, a lateral part disposed on a side surface of the magnet, and a protrusion part that protrudes from the lateral part in an axial direction of the shaft,
wherein the protrusion part is disposed at the portion where the lower part and the lateral part are connected, and
wherein a thickness of the protrusion part is an average value of a thickness of the upper part, a thickness of the lateral part, and a thickness of the lower part.

10. A motor comprising:
a stator;
a rotor disposed inside the stator; and
a shaft coupled to the rotor,
wherein the rotor includes a rotor core disposed outside the shaft, a magnet disposed outside the rotor core, and a molding portion which molds the rotor core and the magnet,
wherein the molding portion includes an upper part disposed on an upper surface of the magnet, a lower part disposed on a lower surface of the magnet, a lateral part disposed on a side surface of the magnet, and a protrusion part that protrudes from the lateral part in an axial direction of the shaft,
wherein the protrusion part is disposed at the portion where the lower part and the lateral part are connected,
wherein the rotor core includes a plurality of holes disposed in a direction of the shaft, and
wherein an inner boundary of the upper part of the molding portion or an inner boundary of the lower part of the molding portion is disposed between an outer circumferential surface of the rotor core and the holes.

11. A motor comprising:
a stator;
a rotor disposed inside the stator; and
a shaft coupled to the rotor, wherein the rotor includes a rotor core disposed outside the shaft, a magnet disposed outside the rotor core, and a molding portion which molds the rotor core and the magnet, wherein the molding portion includes an upper part disposed on an upper surface of the magnet, a lower part disposed on a lower surface of the magnet, a lateral part disposed on a side surface of the magnet, and a protrusion part that protrudes from the lateral part in an axial direction of the shaft, wherein the protrusion part is disposed at the portion where the lower part and the lateral part are connected, and wherein the protrusion part is formed at a side opposite an injection molding gate of the molding portion.

* * * * *